United States Patent [19]

Watanabe

[11] Patent Number: 4,734,568

[45] Date of Patent: Mar. 29, 1988

[54] IC CARD WHICH CAN SET SECURITY LEVEL FOR EVERY MEMORY AREA

[75] Inventor: Hiroshi Watanabe, Kokubunji, Japan

[73] Assignee: Toppan Moore Company, Ltd., Tokyo, Japan

[21] Appl. No.: 891,876

[22] Filed: Jul. 30, 1986

[30] Foreign Application Priority Data

Jul. 31, 1985 [JP] Japan .................... 60-169236

[51] Int. Cl.⁴ ............................ G06K 19/06
[52] U.S. Cl. ...................... 235/487; 235/380
[58] Field of Search .................. 235/380, 487

[56] References Cited

U.S. PATENT DOCUMENTS 4,105,156 8/1978 Dethloff ................ 235/487
4,211,919 7/1980 Ugon ..................... 235/487

Primary Examiner—Harold I. Pitts
Attorney, Agent, or Firm—Kenyon & Kenyon

[57] ABSTRACT

An IC card which can set a security level for every memory area. A plurality of memory areas for storing data in accordance with the kinds of data; a secret identification number area for storing a plurality of secret identification numbers; a security level memory area for storing the input condition of the input secret identification number consisting of at least one of the secret identification numbers so as to specify this input condition for each memory area; and means for allowing the relevant memory area to be accessed after confirming that the secret identification number or numbers according to a predetermined security level were input.

8 Claims, 18 Drawing Figures

FIG. 7

| CODE OF SECURITY LEVEL | SECRET IDENTIFICATION KEY NECESSARY TO ACCESS | EXAMPLES OF APPLICATION IN BANKS |
|---|---|---|
| 0 0 0 | INACCESSIBLE | INACCESSIBLE |
| 0 0 1 | PERSONAL KEY | READ OUT AND PRINT THE BALANCE OF ACCOUNT |
| 0 1 0 | MANAGEMENT KEY | READ OUT THE BUSINESS DATA |
| 0 1 1 | PERSONAL KEY OR MANAGEMENT KEY | READ OUT THE BALANCE OF ACCOUNT |
| 1 0 0 | PERSONAL KEY AND MANAGEMENT KEY | WRITE DATA IN SAVING OR DRAWING OF MONEY |
| 1 0 1 | ISSUER KEY | INVESTIGATE THE HISTORY OF USE OF THE CARD |
| 1 1 0 | — | — |
| 1 1 1 | KEY IS UNNECESSARY | RULES OF USE OF THE CARD |

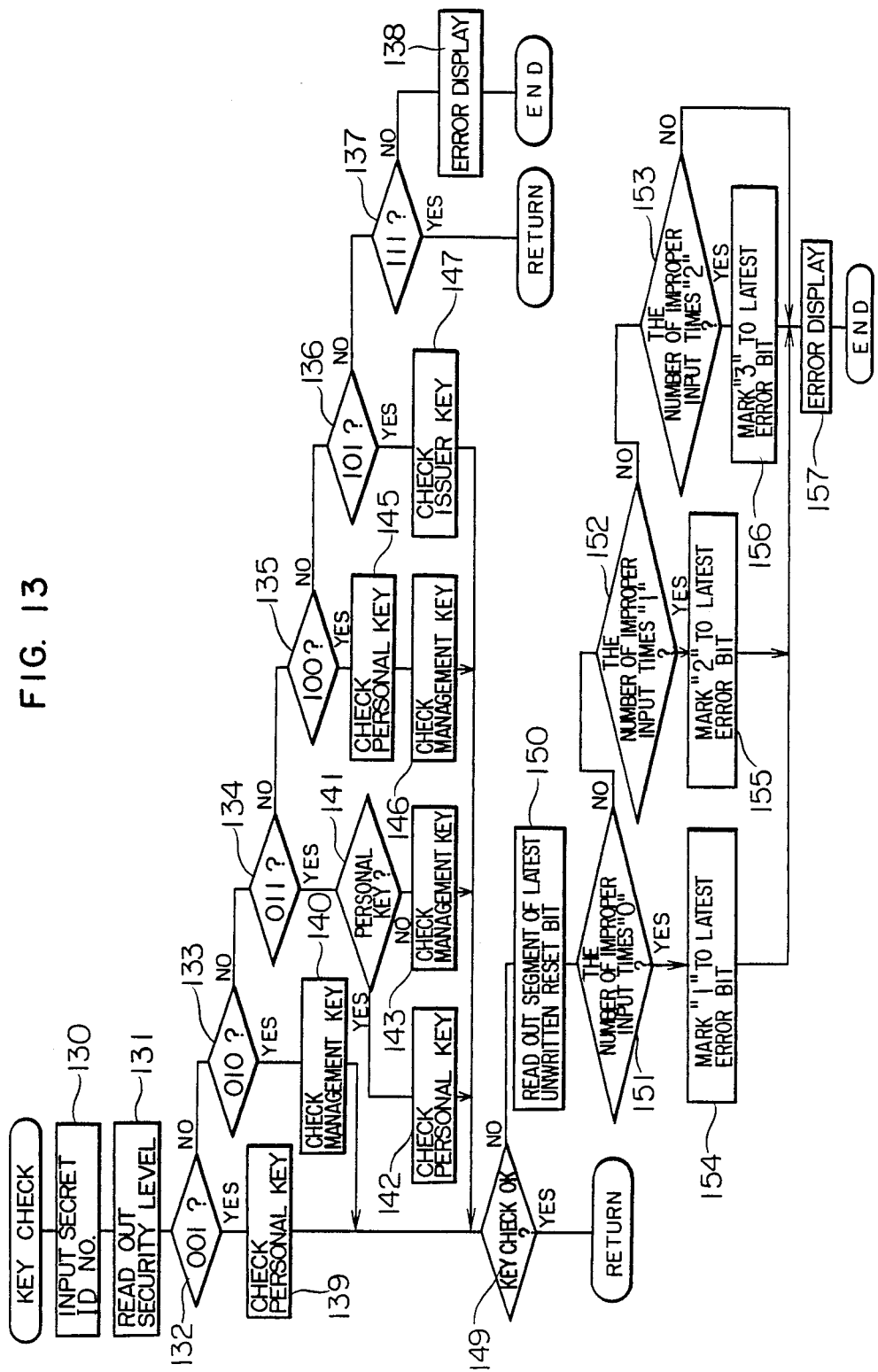

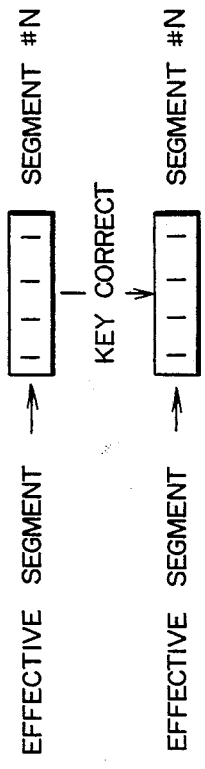
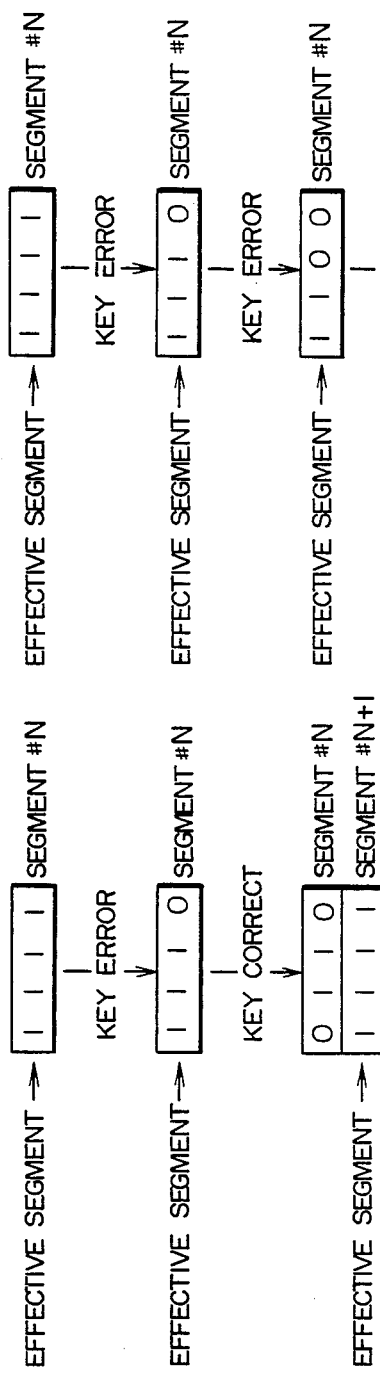
FIG. 14A
FIG. 14B
FIG. 14C

IC CARD WHICH CAN SET SECURITY LEVEL FOR EVERY MEMORY AREA

BACKGROUND OF THE INVENTION

The present invention relates to an IC card which can set at least one security level for every memory area and, more particularly, to an IC card which can access a desired area in a memory after confirming that a predetermined secret identification number had been input.

IC cards are also called smart cards and not only flat-shaped cards but also key-shaped or stick-like cards, and the like exist. Therefore, it is assumed that IC cards according to the present invention include all of those cards.

The IC card in which a desired memory section is accessed after confirming that a predetermined secret identification number had been input has been disclosed in, for example, U.S. Pat. No. 4,211,919. According to this patent, data can be written and read out from the outside into a data memory area as a whole, and this data memory area can be accessed for reading and writing data only when a predetermined secret identification number is input, and what is called a security level of the memory area is unified.

In accordance with the kinds and contents of data, there is the case where the data needs to be classified into the data at several security levels such as: data having no secrecy such as data of the content informing commercial messages of the card issuer or data like card use rules such as "this card cannot be lent to others" and the like; data having an extremely high secrecy such as balance of account, clinical history, or the like; data concerned with the drawing of cash of the savings which requires not only the secrecy but also the safety; data which requires the secret identification number for every business unit as in what is called a composite IC card in which data of a plurality of business units among banks, credit companies, department stores, securities companies, hospitals, and the like is stored in a single IC card; and the like. Particularly, in association with a variety of uses of IC cards and the highly advanced use styles of IC cards, it is required to provide various kinds of security levels in use of the same card.

SUMMARY OF THE INVENTION

The present invention is made in consideration of the foregoing points and it is an object of the invention to provide an IC card having a security holding function in which a plurality of security levels classified in accordance with the kinds and contents of the information to be recorded in the IC card are prepared, and the writing and reading operations of data are executed after confirming the conformity by verifying the necessary secret identification number according to a predetermined security level.

According to an IC card which can select a security level of the invention, there is provided an IC card provided with an electronic circuit including a microprocessor and a memory therein, wherein a plurality of secret identification numbers are stored into the memory, a plurality of conditions to access a desired memory area among a plurality of memory areas in the memory are set for every memory area within a range of those plurality of secret identification numbers, a check is made to see if the necessary input secret identification number or numbers coincide with the conditions set with respect to the memory area to be accessed which was designated, the access for this memory area is allowed when they coincide, and the access for this area is inhibited when they don't coincide.

BRIEF DESCRIPTION OF THE DRAWINGS

FIG. 7 is a diagram showing examples of security levels according to the invention and an example of application thereof;

FIG. 13 is a flowchart showing the details of a key check routine;

FIGS. 14A to 14C are diagrams showing another embodiment for setting the conditions for locking;

DESCRIPTION OF THE PREFERRED EMBODIMENTS

Figure 1:
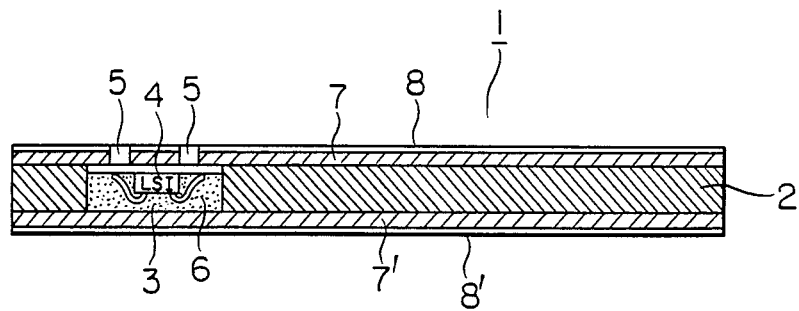
FIG. 1 is a cross sectional view showing a structure of an IC card according to the present invention.

An IC card according to the present invention generally has such a structure as shown in FIG. 1. An IC card 1 has a card core 2 made of a plastic material or the like as a central layer. A space portion 3 is formed in a part of the card core 2. An IC module 4 is enclosed in the space portion 3. One or two LSI chips are attached to the IC module 4. This IC module is provided with eight contact terminals 5, thereby providing an electrical connection between an external circuit and the electronic circuit including the IC module 4.

The space portion 3 is filled with a filler material 6 to protect the IC module. Printed layers 7 and 7' are joined to the upper and lower surfaces of the card core 2. Graphic images, characters, and the like are printed as necessary on the surfaces of the printed layers 7 and 7' and the surfaces of these printed layers are further covered with surface layers 8 and 8' adapted to protect them, respectively. FIG. 1 is an enlarged diagram which is shown by exaggerating a thickness of this IC card. However, for example, as actual thicknesses, the card core has a thickness of 0.55 mm, each of the printed layers has a thickness of 0.1 mm, and each of the surface layers has a thickness of 0.02 mm, so that the whole thickness of the IC card is about 0.8 mm.

Figure 2:
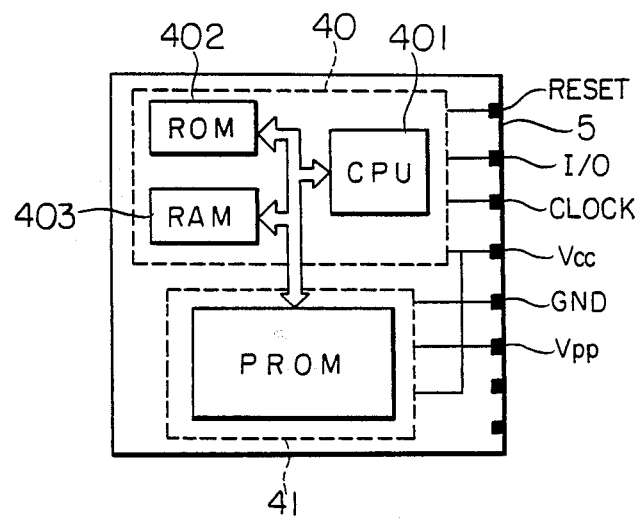
FIG. 2 is a circuit constitutional diagram of the IC card of the invention.

FIG. 2 is a block diagram showing an example of a constitution of integrated circuits (IC) included in the IC module 4. In this case, FIG. 2 shows an example of a constitution of two chips consisting of a CPU chip 40 and a memory chip 41. In the CPU 40, a CPU 401 performs the controls according to programs, a ROM 402 stores the programs and the like, and a RAM 403 temporarily stores data during execution of program steps. The memory chip 41 has a PROM in which data is mainly stored. Although many kinds of PROMs have been known, an EPROM due to the ultraviolet rays (when this memory is embedded in an IC card, the data can be erased only when a window adapted to transmit the ultraviolet rays is formed), an EEPROM which can erase the data, or the like may be used as a PROM.

Figure 3:
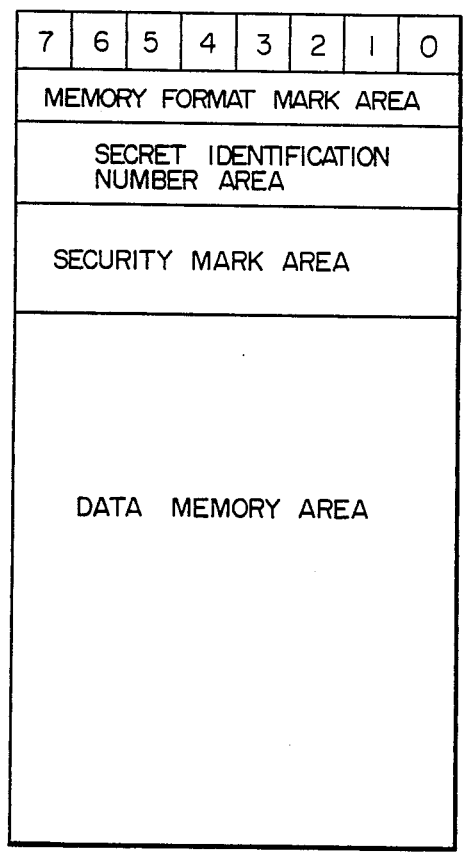
FIG. 3 is a diagram showing a whole arrangement of a memory.

FIG. 3 shows an arrangement of the memory. This memory includes: a data memory area (PROM) for storing data; a secret identification number area (ROM) for storing secret identification numbers; a security mark area (PROM) for storing error input of the secret identification number; and a memory format mark area (PROM) indicating that data has already been recorded in the memory.

Figure 4:
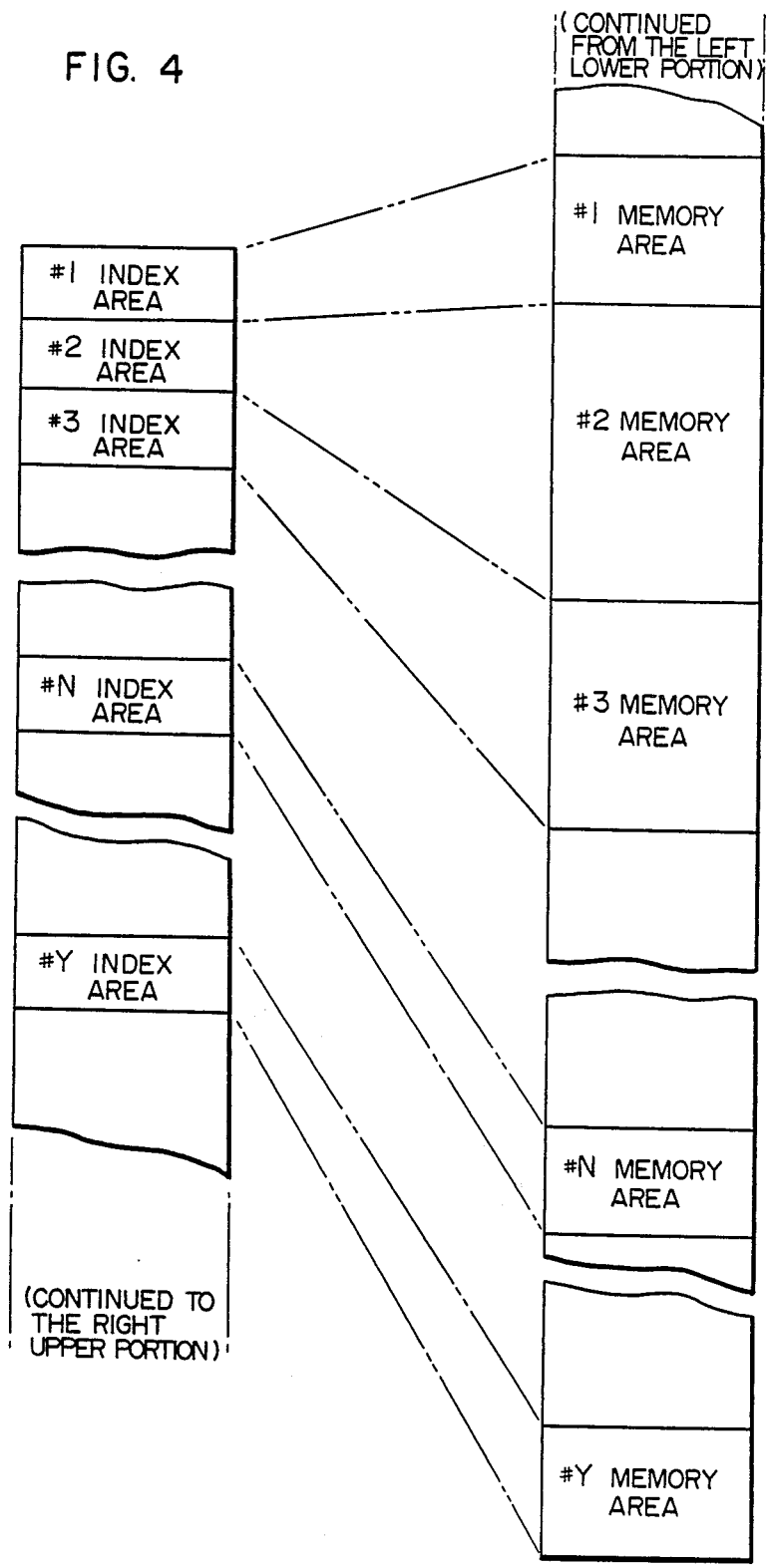
FIG. 4 is an explanatory diagram showing the concept of an arrangement of data memory areas shown in FIG. 3.

FIG. 4 shows further in detail a format of a data memory area in FIG. 3 according to the invention. This memory includes a plurality of memory areas #1 to #Y and a plurality of index areas #1 to #Y provided in correspondence to the respective memory areas. Data is stored into each memory area in accordance with a segment for every predetermined desired item. The index areas are provided in corresponding to the respective memory areas and used to access the corresponding memory areas, respectively.

Figure 5:
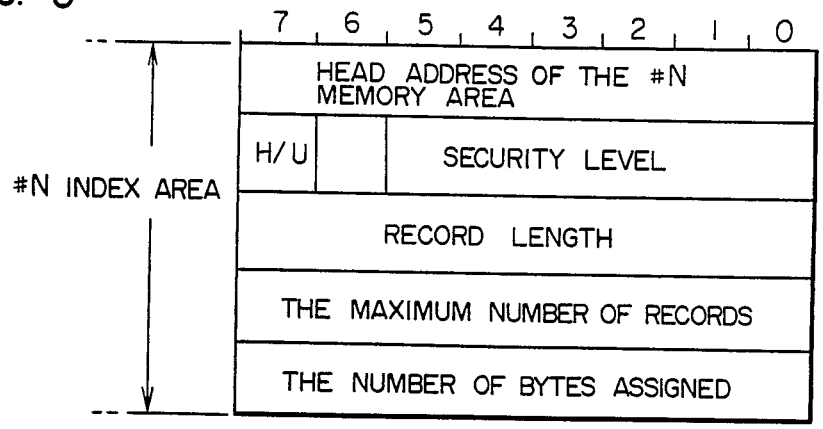
FIG. 5 is a diagram showing the details of one index area in FIG. 4.

FIG. 5 is a diagram showing the details of the #N index area as one of the index areas shown in FIG. 4. The index area has: an area consisting of eight bits for storing the head address of the #N memory area; an area consisting of six bits for setting the "security level" necessary to access upon writing and reading operations of data; an "H/U" bit of one bit which becomes "1" in the case of history information such that all of the recorded data is read out and becomes "0" in the case of updating information such that only the data recorded lastly is read out; an area consisting of eight bits for recording a "record length" in the #N memory area by way of the number of bytes; an area for recording "the maximum number of records" indicative of the number of records assigned to the #N memory area; and an area for recording "the number of bytes assigned" of the flag bits locating in the head address portion in the #N memory area.

According to an embodiment of the invention, for example, a plurality of conditions to access a desired area in the memory include the following concepts.

(i) The concept: Namely, one secret identification number is previously determined and a check is made to see if the input number coincides with this secret identification number or not. Only when they coincide, the memory is accessed to enable data to be written into and read out of the memory.

(ii) The concept: Namely, in the case of using a plurality of secret identification numbers, the first input number (primary key) is verified with a predetermined primary secret identification number. After the coincidence of them was confirmed, the secondary key is input and a check is made to see if it coincides with a predetermined secondary secret identification number or not. In this manner, after the verification was sequentially performed, a desired process can be executed.

(iii) The concept: Namely, either one of the first secret identification number (key A) and the second secret identification number (key B) is input. When either one of them coincides with corresponding one of predetermined secret identification numbers, this area can be accessed. Namely, this method belongs to the concept of what is called (OR).

(iv) The concept: Namely, both of the keys A and B are input. Only when they coincide with corresponding predetermined secret identification numbers, the relevant area can be accessed. This method belongs to the concept of what is called (AND).

(v) The concept: Namely, if AND of the keys A and B or AND of the key A and the third secret identification number (key C) is satisfied, the memory can be accessed.

According to another embodiment of the present invention, it is also possible to include the condition such that no input key is necessary at all.

Due to this, a plurality of secret identification numbers are preliminarily stored into the memory. These secret identification numbers are combined within a range of those numbers and a plurality of conditions of different security levels consisting of combinations of OR, AND, and the like are provided. The condition necessary to access the area in the memory into which each information is recorded is selected and set from among a plurality of conditions in accordance with the characteristic, kind, and the like of the information. Therefore, the proper security level can be set in accordance with degrees of secrecy and safety of each information. At the same time, the security levels can be arbitrarily defined and set in accordance with a variety of applications of IC cards. Consequently, it is possible to provide the IC card adapted to highly advanced use styles and a variety of uses of IC cards.

Figure 6:
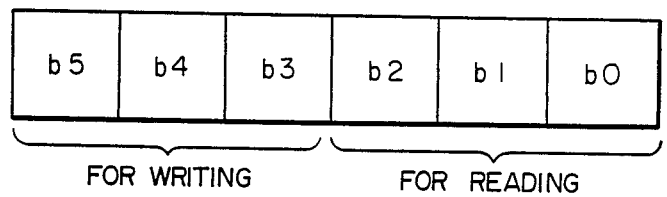
FIG. 6 is a diagram showing the details of the area of the security level in FIG. 5.

FIG. 6 is a diagram showing further in detail the content of the area of the "security level" in FIG. 5. This area consists of six bits and lower three bits are used to record the security level for reading and upper three bits are used to record the security level for writing. With this constitution, the security levels upon writing and reading can be made different with respect to the same information as well, thereby enabling various applications of IC cards to be realized.

The following three secret identification numbers are used in an embodiment of the invention.

(1) The personal identification number (personal key) of the cardholder himself:

This secret identification number consists of four digits and is written into the secret identification number area of the PROM due to the determination of the cardholder.

(2) Secret identification number (management key) of the manager of the card:

The secret identification number consisting of eight digits which enables the card manager (for example, the individual bank or branch in the case of unified cards in the bank business world) to perform the double protection due to a combination of the personal key. This number is stored into the PROM.

(3) The secret identification number (issuer key; in the case of the above-mentioned example, the unified key in the bank business world) of the card issuer:

The secret identification number consisting of eight digits which is used when the card issuer writes the personal key or management key, or the like. This number is masked and stored into the ROM.

FIG. 7 shows practical examples whereby the security levels were defined using those secret identification numbers. As shown in FIG. 6, the security level is defined by three bits with respect to each of the writing and reading operations. "000" indicates the security level at which the memory cannot be accessed. "001" denotes the security level at which the memory can be accessed by inputting only the personal key, and the cases where the balance of account is read out and printed and the like can be mentioned as an example of application in banks. "010" represents the security level at which the memory can be accessed by only the management key and, for example, the case where the data concerned with the banking business is read out and the like can be mentioned. "011" is the security level at which the memory can be accessed by either the personal key or the management key and this level can be used in the cases where the balance of account is read out and the like. "100" indicates the security level at which the memory can be accessed only when both of the personal key and the management key were correctly input and this level can be used, for example, to write data in saving or drawing of money. "101" indicates the security level at which the memory can be accessed by only the issuer key and this level can be used in the cases of investigating the history of use of the card and the like. "110" represents the undefined security level. "111" denotes the security level at which no key input is needed and this level can be used, for example, to write and read out the card use rules and the like.

The above security levels are provided for each area in the memory. Predetermined secret identification numbers according to the security level are input prior to accessing each area. The data processes can be executed when those secret identification numbers coincide with the corresponding secret identification numbers stored in the memory. However, since there is also the fear such that the card is illegally used, when the improper secret identification number is input, it is necessary to take the countermeasure on the basis of the number of improper input times. The security mark area in FIG. 3 is used for this purpose.

Figure 8:
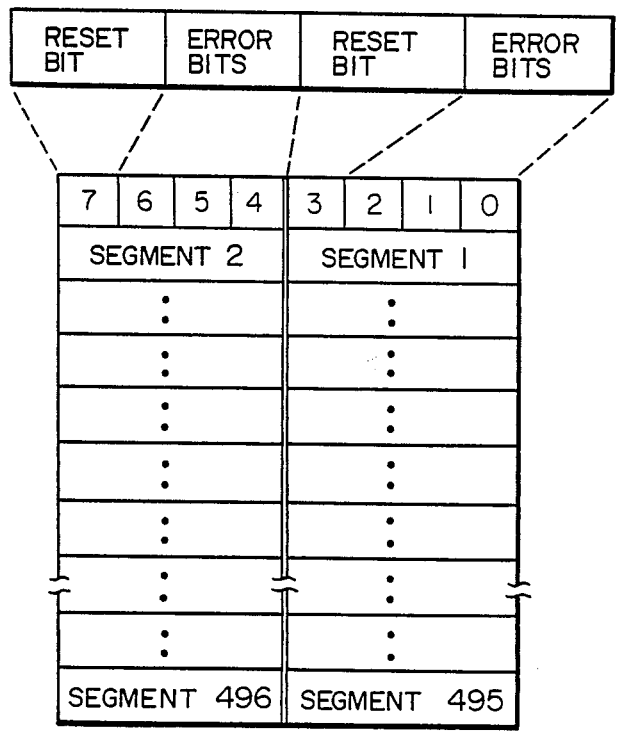
FIG. 8 is an explanatory diagram showing a constitution of a security mark area shown in FIG. 3.

As shown in FIG. 8, the security mark area has a group of error bits for recording the number of improper input times of the secret identification number and a group of reset bits for indicating the locked state in which the card cannot be used when the number of improper input times reaches a predetermined value and the unlocked state to make it possible to use the card again.

For assignment of the error bits and reset bits, as shown in FIG. 8, one byte (eight bits) is divided into two equal parts and one segment is constituted by four bits. Lower three bits are used as error bits and upper one bit is used as a reset bit. Total 496 segments are provided. However, the number of bits of each segment, the number of segments, and the dividing method are not limited to them.

Figure 9:
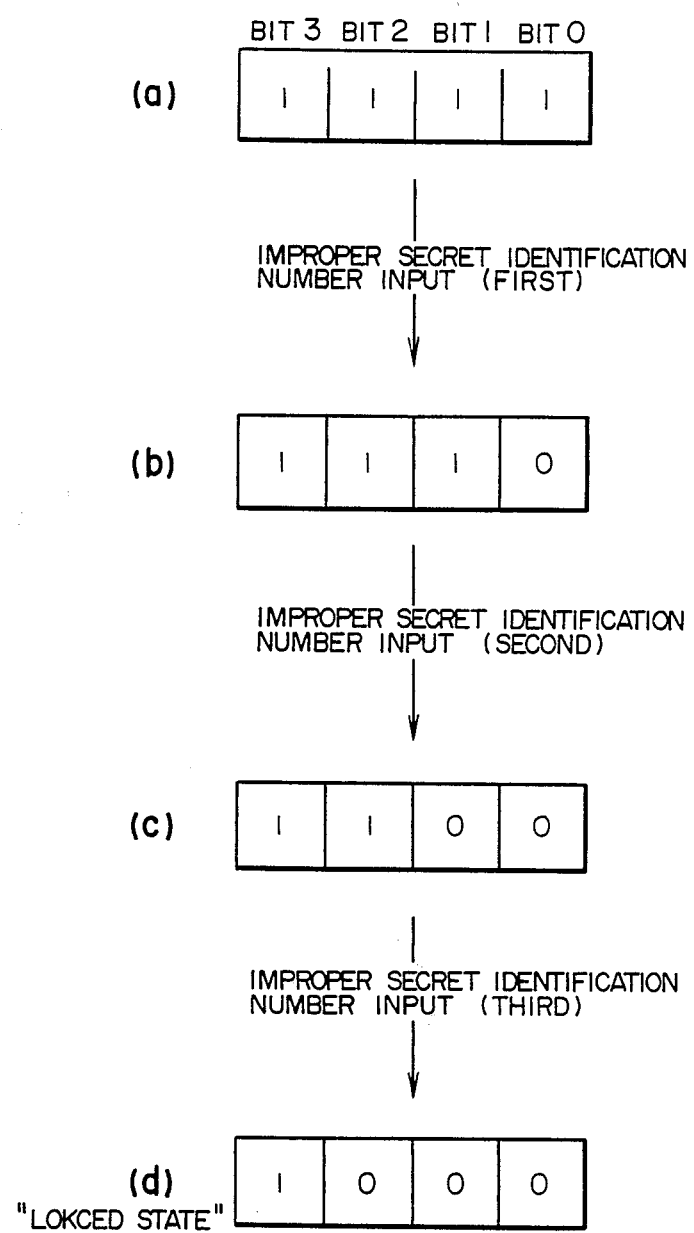
FIG. 9 is a diagram, consisting of (a)-(d) for explaining a method of using the latest segment shown in FIG. 8.

The limitation of access to the data for the improper input of the secret identification number in this embodiment will now be described in detail with reference to a logic diagram of one segment shown in FIG. 9. In FIG. 9, (a) shows the case where none of error bits writing the number of improper input times of the secret identification numbers nor a written reset bit is written in the segment and in this case, all bits are 1 (each bit is 1 before writing and becomes 0 after writing). When an improper secret identification number is input, the first improper input is recorded into the least significant bit (bit 0) into which an error bit can be written. Namely, the least significant bit (bit 0) changes from 1 to 0 (FIG. 9(b)). Next, when an improper secret identification number is input at the second time, the bit (bit 1) of the second digit as the least significant bit into which an error bit can be written changes from 1 to 0 (FIG. 9(c)). When the third improper input is made, the third bit (bit 2) changes from 1 to 0 (FIG. 9(d)). Thus, the segment becomes the locked state (1000) in which there is no unwritten error bit in the segment. At this time, the number of improper input times reaches an allowable limit value, thereby disenabling the IC card to be used.

Figure 10:
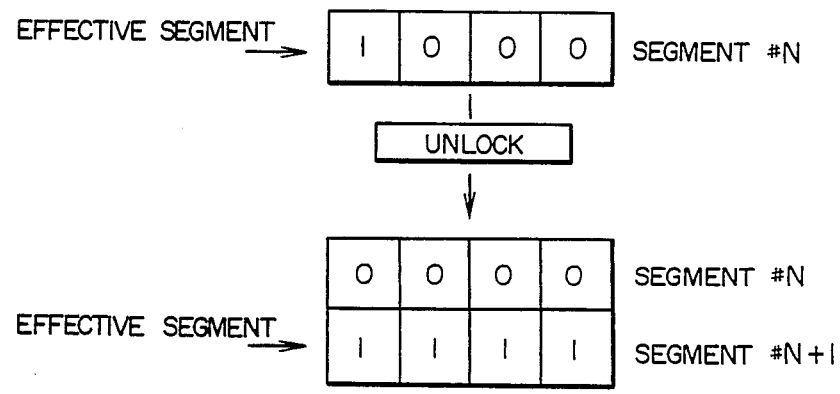
FIGS. 10 and 11 are diagrams for explaining the principle to unlock the locked state.
Figure 11:
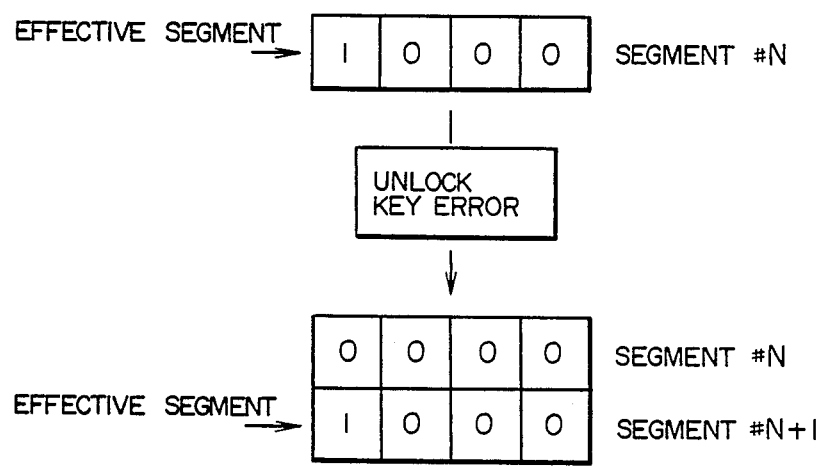

With reference to a logic diagram of the segment of FIG. 11, an explanation will now be made with respect to the shift of the segment necessary to recover the access to the data by again using the IC card in the case where the number of improper input times of the secret identification number has reached the allowable limit value. FIG. 10 shows the case of writing the reset bits of the segment (0000) by use of an unlock command to make it possible to again use the segment #N (1000) in which the error bits have already reached the allowable limit value. The unlock command functions to shift the effective segment to the next segment (#N+1). Since the unlocking process requires a high security level, secret identification numbers other than the ordinary personal identification number, for example, the issuer key and management key are previously recorded into the memory before the IC card is issued and two kinds among these keys are used as keys to unlock.

In the logic diagram of FIG. 10, the process to shift the effective segment from #N to #N+1 means that in the case where the security mark area is constituted by an erasable memory element (RAM, EEPROM, or the like), the same segment is changed from the written state (0000) to the erased state (1111). In another embodiment including an unerasable memory element (PROM or the like), this process means that the segment is shifted from the segment in the address #N to the segment in the next address #N+1. When an improper key is input upon unlocking, this key is not written into the memory but the improper input error is displayed in the embodiment using an EEPROM. However, in the embodiment using a PROM, a reset bit of the effective segment is written to change the next segment to the effective segment, thereby allowing the segment to become the locked state (1000) (FIG. 11). In other words, the IC card cannot be used. On the other hand, in this embodiment using a PROM, the security mark area is constituted by 496 segments and when all of the segments have been written, the IC card cannot be used again. However, in the embodiment using an EEPROM, this limitation is eliminated.

The operation of the IC card when it is used will now be described hereinbelow with reference to a flowchart shown in FIG. 12 in accordance with the order of use of the IC card.

First, in step 100, the initialization is made by inserting the IC card into an input/output apparatus. In the next step 101, the segment of the latest unwritten reset bit (reset bit=1) in the security mark area is read out. In step 102, a check is made by the input/output apparatus to see if the number of improper input times of the secret identification number is less than three or not (namely, the number of illegal use times of the IC card is less than three or not). If YES in step 102, namely, if the number of improper input times of the secret identification number is less than three, step 103 follows and a command to read out data from or write data into the IC card is input. If NO in step 102, namely, when the number of improper input times of the secret identification number has reached three, an error is displayed by the input/output apparatus (step 104).

When the command is input in step 103, a check is made to see if this command instructs the reading or writing of the data in steps 105 and 106. Thereafter, the memory area number to be accessed is input in each of steps 107 and 108. A check is made in steps 110 and 111 to see if the input memory area number exists or not. If NO, an error is displayed in steps 112 and 113. If YES, a check is made in steps 114 and 115 to see if the input secret identification number coincides with the secret identification number based on a predetermined security level or not. These key checking processes in steps 114 and 115 will be explained hereinafter with reference to FIG. 13.

If YES in step 114, namely, when the coincidence is determined, the H/U bit in the index area corresponding to the designated memory area is read out in step 117. In step 118, a check is made to see if the history information or the updating information has been recorded in this memory area. If the history information has been recorded, the history read out process is executed in step 119. If the updating information has been recorded, the updating readout process is executed in step 120.

If the coincidence is decided in step 115, the data to be written is input in step 122 and this writing process is executed in step 123.

If NO in step 106, none of the data writing and read-out processes is instructed; therefore, a check is then made in step 125 to see if the secret identification number has been written or not. If NO in step 125, other necessary data is written in step 126. If YES in step 125, the secret identification number is written in step 127.

Figure 12:
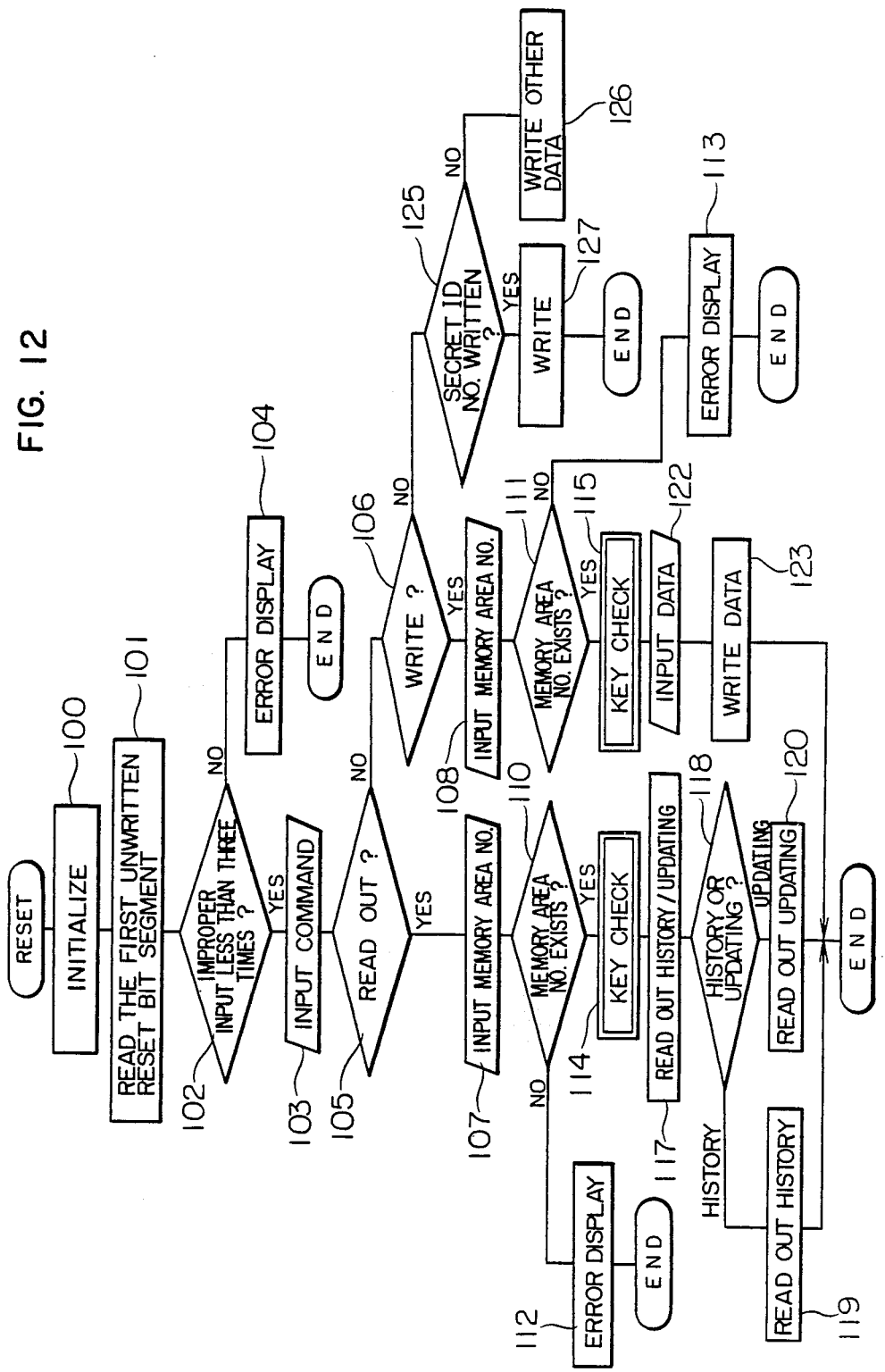
FIG. 12 is a flowchart for explaining the operation when the IC card according to the invention is used.

Both key checking steps 114 and 115 in FIG. 12 have the same content and its details are shown in FIG. 13.

In FIG. 13, the secret identification number is first input in step 130. Next, the security level recorded in the corresponding index area in the designated memory area is read out in step 131. The read security level is sequentially discriminated in steps 132 to 137 on the basis of the contents shown in FIG. 7. If NO in all of the steps 132 to 137, the security level which can be accessed doesn't exist, so that an error is displayed in step 138.

If YES in step 132, the security level corresponds to only the personal key. Therefore, a check is made in step 139 to see if the input secret identification number coincides with a predetermined personal key or not. If YES in step 133, the security level corresponds to only the management key; therefore, a check is made in step 140 to see if the input secret identification number coincides with a predetermined management key or not. If YES in step 134, the security level corresponds to the personal key or management key; therefore, a check is first made in step 141 to see if the input key is the personal key or not. If it is the personal key, a check is made in step 142 to see if the input key coincides with a predetermined personal key or not. If NO, a check is made in step 143 to see if the input key coincides with a predetermined management key or not. If YES in step 135, the security level corresponds to both inputs of the personal and management keys; therefore, a check is first made in step 145 to see if one input key coincides with a predetermined personal key or not and a check is then made in step 146 to see if another input key coincides with a predetermined management key or not. If YES in step 136, the security level corresponds to only the issuer key; therefore, a check is made in step 147 to see if the input key coincides with a predetermined issuer key or not. A check is made in step 149 to see if the coincidence has been determined in each of the above checking steps 132 to 136 or not. If YES in step 149, the processing routine is returned to step 117 or 122 in FIG. 12. If YES in step 137, the processing routine is also returned to step 117 or 122.

If NO in step 149, the segment having the latest unwritten reset bit in the security mark area is read out in step 150. The number of improper input times recorded in the segment is discriminated in steps 151, 152, and 153. When the number of improper input times is zero, the answer is YES in step 151, so that "0" is written into the least significant error bit of the latest segment in step 154. If the number of improper input times is one, the answer is YES in step 152, so that "0" is written into the error bit of the second digit in step 155. If the number of improper input times is two, the answer is YES in step 153, so that "0" is written into the error bit of the third digit in step 156, thereby allowing the segment to become the locked state. After completion of the writing process in step 154, 155, or 156, an error is displayed in step 157. On the contrary, if NO in step 153, the segment is in the locked state; therefore, an error is displayed in step 157 without writing any data into the latest segment.

The second embodiment to set the lock condition will now be described. In this embodiment, when the IC card was further accessed in the state in which one (1110) or two (1100) improper secret identification numbers had been recorded in the segment (FIGS. 14B and 14C), if the correct secret identification number is input, the effective segment can be shifted to the next segment. Since the shifted effective segment is 1111, the number of improper input times of the secret identification number becomes zero, so that it will not be increased. Namely, a constant number of improper input times is always secured.

In the second embodiment, the constitution in the first embodiment such that the number of improper input times of the secret identification number is always counted and written into the error bit is changed. Namely, if the correct secret identification number is input, even if the error bit of the number of improper input times was written as well, by writing the reset bit, the count number of improper input times can be executed in the new segment.

Figure 15:
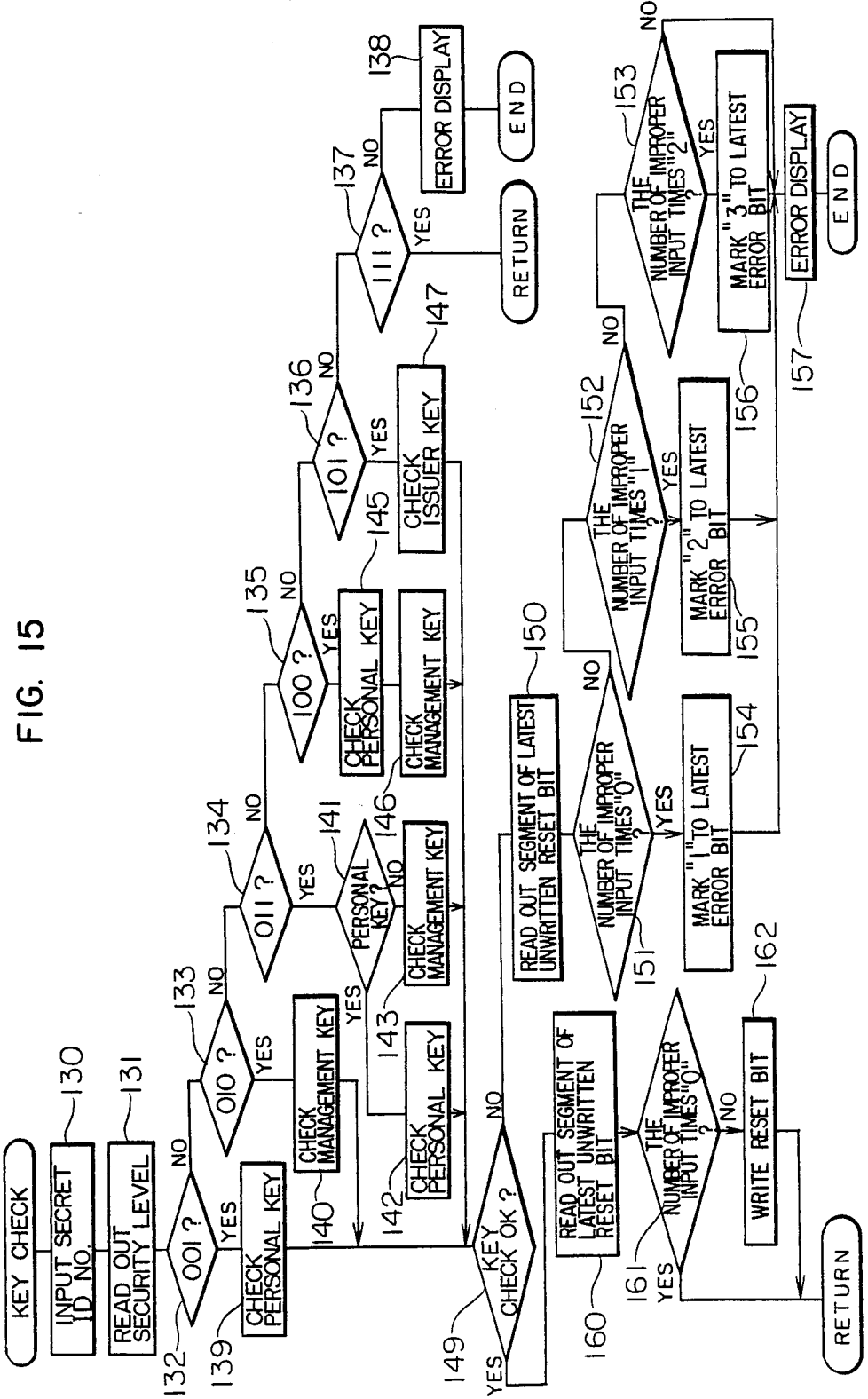
FIG. 15 is a flowchart for a key checking routine in the embodiment shown in FIG. 14.

An explanation will now be made further in detail with reference to logic diagrams of the segments shown in FIGS. 14A to 14C and a flowchart shown in FIG. 15.

FIG. 14A is a logic diagram of the segment in the case where the correct secret identification number was first input. The segment (#N) is (1111) and no error bit is recorded. FIG. 14B shows the case where the correct secret identification number was input after the improper secret identification number had been input once (1110). The effective segment (#N) is shifted to the next segment (#N+1). Namely, the logic of the segment before shift is as follows. By writing the reset bit, the segment (#N) is set to (0110) and the count to the error bit of the segment (#N) is inhibited, thereby allowing the number of improper input times to be counted to the next segment (#N+1). By writing the reset bit as the most significant bit of the segment, the bit is changed from 1 to 0 and the effective segment (#N) is shifted to the next segment (#N+1). The segment (#N) before shift may be also set to (0000); however, by setting the segment to (0110), the record of the improper input can be left.

FIG. 14C shows the case where the correct secret identification number was input after two improper secret identification numbers had been input (1100). The effective segment (#N) is shifted to the next segment (#N+1) and becomes the state in which no error is written. Thus, the segment becomes the state in which the improper input can be written into a new error bit.

Although the segment (#N) before shift can be also set to (0000), by setting the segment to (0100), the record of the improper input can be left.

The above description will now be made further in detail with reference to a flowchart of FIG. 15 in accordance with the order of actual use of the IC card. Since the processes in steps 130 to 157 are substantially the same as those in the first embodiment, their descriptions are omitted. The process in the case where the correct secret identification number has been input (YES) in step 149 differs and this different point will now be described hereinbelow. When it is determined that the correct secret identification number has been input in step 149, step 160 follows. In step 160, the segment of the latest unwritten reset bit in the security mark area is read out. A check is made in step 161 to see if the number of improper input times is zero or not on the basis of this segment. If it is zero, the processing routine is returned to step 117 or 122 (FIG. 12). On the contrary, if NO in step 161, the reset bit is written in step 162 to set the segment into (0110) (when one improper secret identification number was input) or (0100) (when two improper secret improper identification numbers were input). Thereafter, the processing routine is returned. Namely, even when the record of the improper input exists in the segment as well, by inputting a correct secret identification number, the effective segment can be shifted to the segment having no record of the improper input. However, if the number of improper input times of the secret identification number has reached three, the IC card will become the locked state. Thus, even if the correct secret identification number is input as well, the IC card cannot be unlocked. In this case, the segment needs to be shifted in accordance with an unlocking routine, which will be explained hereinafter.

According to this embodiment, if the record of the improper input of the secret identification number (once or twice) exists and the correct secret identification number is input, the record of the improper input of the secret identification number will not be accumulated. Therefore, it is possible to provide the practical IC card for the improper input of the secret identification number due to the mistake and the like of the nser (or cardholder) of the IC card.

When the IC card is locked in step 156, the IC card cannot be used since then. This locked state can be released in accordance with a procedure shown in FIG. 16 and can be used again. The details of this unlocking routine will be described with reference to FIG. 16.

Figure 16:
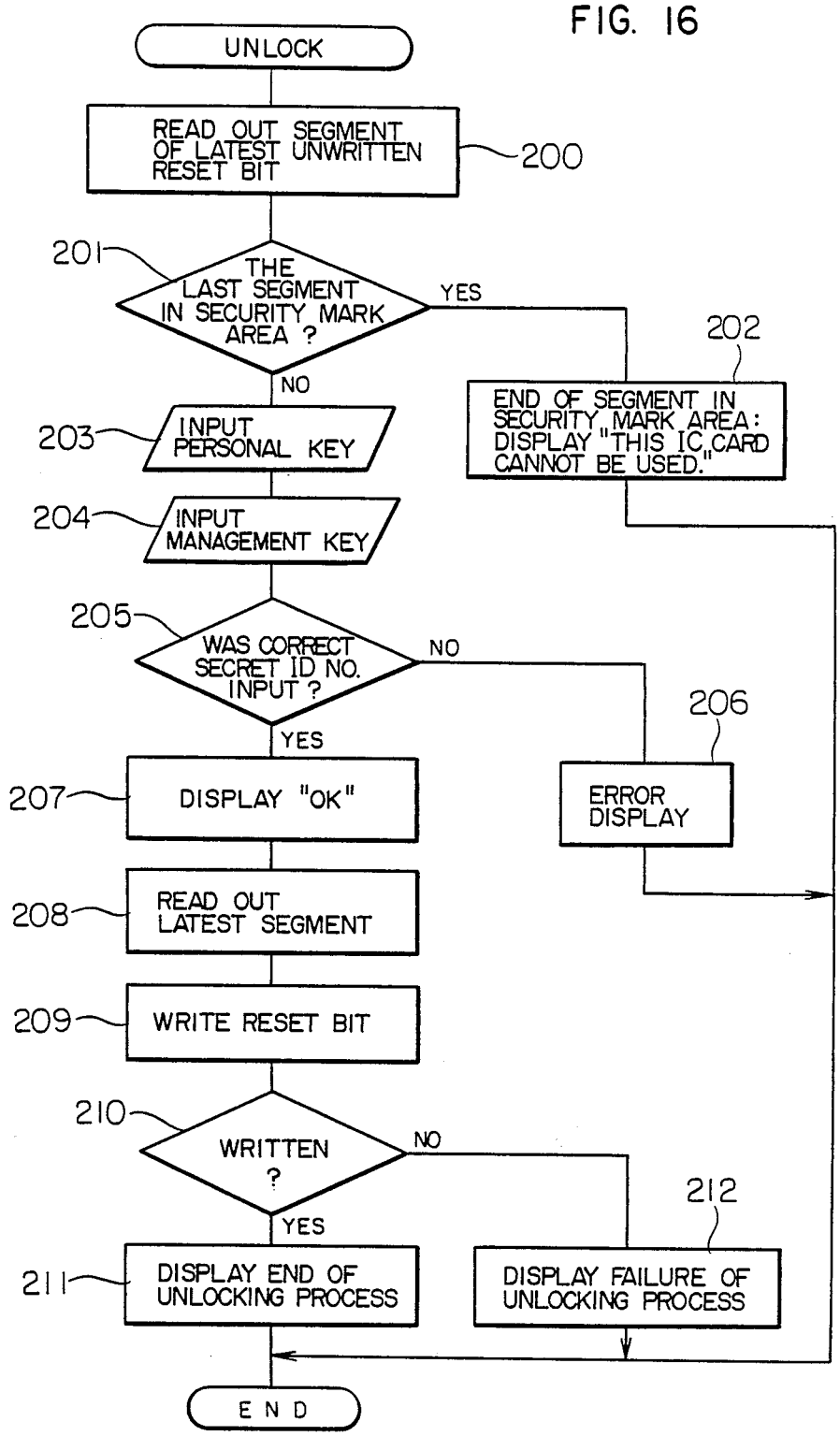
FIG. 16 is a flowchart for an unlocking routine.

In FIG. 16, the segment of the latest unwritten reset bit is first read out in step 200. A check is then made in step 201 to see if the next segment is the last segment in the security mark area or not. If YES, step 202 follows and a message "This IC card cannot be used." is displayed and the control routine is finished (this checking step may be omitted in the case of using a RAM or EEPROM). If some segments are left in the security mark area (namely, NO) in step 201, by writing "0" into the latest reset bit, the IC card can be used again. However, since the locked state is provided to prevent the illegal use, a particularly high security level is required to release the locked state. For this purpose, it is proper to use the security level "100" shown in FIG. 7. Therefore, the personal key and the management key are input in steps 203 and 204, respectively, and a check is made to see if both of those secret identification numbers coincide with predetermined secret identification numbers stored in the memory or not. If they don't coincide (i.e., NO) an error is displayed in step 206. In this case, as described in FIG. 11, "0" is recorded to the reset bit of the effective segment and at the same time, the next segment is locked. Due to this, the improper input of the key upon unlocking can be also recorded.

If the coincidence is determined (YES) in step 205, a message indicating that the correct key input has been confirmed is displayed in step 207. Further, the latest segment is read out in step 208. "0" is written into the reset bit of this segment in step 209. A check is made in step 210 to see if it has been written or not. If YES in step 210, the end of unlocking process is displayed in step 211. If the unlocking process is failed (NO) in step 210, this fact is displayed in step 212.

I claim:

1. An IC card which can set a security level for each memory area, having at least a microprocessor and a memory, said memory comprising:

a plurality of memory areas for respectively storing data classified in accordance with kinds of data which can be written and read out from the outside;

a key code area for storing a plurality of key codes; and security level memory means for storing a group of key code input conditions each consisting of at least one of said plurality of key codes in correspondence to each of said memory areas and each for accessing each of said plurality of memory areas; and said microprocessor comprising means for accessing the relevant memory area to be accessed after confirming that the key code or key codes specified by said key code input condition was/were input.

2. An IC card according to claim 1, wherein said group of key code input conditions include at least the condition such that both of the two key codes coincide and the condition such that at least one of the two key codes coincides.

3. An IC card according to claim 1, wherein said group of key code input conditions include the condition such that there is no need to input the key code.

4. An IC card according to claim 1, wherein said security level memory means is provided in correspondence to each of said memory areas and set in an index area to specify the corresponding memory area.

5. An IC card according to claim 1, wherein said microprocessor is further provided with: means for counting the number of improper input times of said key code; and means for inhibiting the operation of said access means when a count value of said counting means reaches a predetermined number.

6. An IC card according to claim 5, wherein said microprocessor is further provided with means for resetting the counting operation of the number of improper input times when a correct key code is input before the count value of said counting means reaches said predetermined number.

7. An IC card according to claim 5, wherein said microprocessor is further provided with means for releasing the inhibited state by said inhibiting means when two or more predetermined correct key codes are input.

8. An IC card according to claim 1, wherein the condition for writing and the condition for reading are set for the key code input condition corresponding to at least the one memory area.

* * * * *